US010742296B2

(12) United States Patent
He

(10) Patent No.: US 10,742,296 B2
(45) Date of Patent: Aug. 11, 2020

(54) MULTI-USER MULTIPLE-INPUT MULTIPLE-OUTPUT U-MIMO DATA TRANSMISSION METHOD AND BASE STATION

(71) Applicant: HUAWEI TECHNOLOGIES CO., LTD., Shenzhen (CN)

(72) Inventor: Longke He, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 16/172,843

(22) Filed: Oct. 28, 2018

(65) Prior Publication Data

US 2019/0068269 A1 Feb. 28, 2019

Related U.S. Application Data

(63) Continuation of application No. PCT/CN2016/080680, filed on Apr. 29, 2016.

(51) Int. Cl.

| H04B 7/06 | (2006.01) |
|---|---|
| H04B 7/0452 | (2017.01) |
| H04W 72/04 | (2009.01) |
| H04L 5/00 | (2006.01) |
| H04B 17/336 | (2015.01) |
| H04B 7/0456 | (2017.01) |
| H04L 1/00 | (2006.01) |

(52) U.S. Cl.
CPC ......... *H04B 7/0639* (2013.01); *H04B 7/0452* (2013.01); *H04B 7/0486* (2013.01);
(Continued)

(58) Field of Classification Search
CPC ...... H04B 7/04; H04B 7/0452; H04B 7/0456; H04B 7/0482; H04B 7/0486; H04B 7/06;
(Continued)

(56) References Cited

U.S. PATENT DOCUMENTS

| 2011/0319027 A1* | 12/2011 | Sayana | H04B 7/0632 455/67.11 |
|---|---|---|---|
| 2012/0213169 A1* | 8/2012 | Wang | H04B 7/04 370/329 |

(Continued)

FOREIGN PATENT DOCUMENTS

| CN | 101888665 A | 11/2010 |
|---|---|---|
| CN | 101998301 A | 3/2011 |

(Continued)

OTHER PUBLICATIONS

Huawei, MIMO Feature Parameter Description, Huawei Technologies Co., Ltd, 260 pages, Aug. 31, 2015.*

(Continued)

*Primary Examiner* — Frank Duong
(74) *Attorney, Agent, or Firm* — Kilpatrick Townsend & Stockton LLP

(57) ABSTRACT

Embodiments of this application provide a MU-MIMO data transmission method, to implement pairing scheduling on UE and improve resource usage. The method includes: obtaining, by a base station, a first precoding matrix indicator PMI of first user equipment UE, where a first rank of the first UE is 1; obtaining, by the base station, a second PMI of second UE, where a second rank of the second UE is 1, and a weighted value corresponding to the first PMI and a weighted value corresponding to the second PMI form a weighted value corresponding to a third PMI whose rank is 2; and separately performing, by the base station by using the third PMI and a same time-frequency resource, data transmission with the first UE and the second UE that are paired, where a pairing gain of the first UE and the second UE is greater than a preset threshold.

10 Claims, 2 Drawing Sheets

Base station

(52) U.S. Cl.
CPC ......... *H04B 7/0632* (2013.01); *H04B 17/336* (2015.01); *H04L 1/0003* (2013.01); *H04L 5/003* (2013.01); *H04L 5/0023* (2013.01); *H04L 5/0037* (2013.01); *H04W 72/04* (2013.01)

(58) Field of Classification Search
CPC .... H04B 7/063; H04B 7/0632; H04B 7/0639; H04B 17/336; H04L 1/0003; H04L 5/0023; H04L 5/003; H04L 5/0037; H04L 27/28; H04W 72/04; H04W 72/10; H04W 72/12

See application file for complete search history.

(56) References Cited

U.S. PATENT DOCUMENTS

| | | | | |
|---|---|---|---|---|
| 2014/0204770 | A1* | 7/2014 | Mondal | H04W 24/00 370/252 |
| 2018/0063856 | A1 | 3/2018 | Yang et al. | |

FOREIGN PATENT DOCUMENTS

| | | |
|---|---|---|
| CN | 102821476 A | 12/2012 |
| CN | 103249162 A | 8/2013 |
| CN | 103326814 A | 9/2013 |

OTHER PUBLICATIONS

XP032314643. Yingpei Huang et al. System performance of PMI-based MU-MIMO, 2012 3rd IEEE International Conference on Network Infrastructure and Digital Content, Sep. 2012, pp. 577-581.

XP032202452. B. Badic et al. Analysis of CQI Prediction for MU-MIMO in LTE Systems, 2012 IEEE 75th Vehicular Technology Conference (VTC Spring). May 2012. 6 pages.

XP050489287. R1-105133, Huawei, HiSilicon: "CQI enhancement for Rel-10 MU MIMO", 3GPP TSG RAN WG1#62bis, Xi'an, China, Oct. 11-15, 2010, 7 pages.

XP050597521. R1-092646, Motorola: "Dynamic SU/MU Mode Switching and Rank Adaptation", 3GPP TSG RAN1#57bis, Los Angeles, USA, Jun. 29-Jul. 3, 2009, 5 pages.

* cited by examiner

MULTI-USER MULTIPLE-INPUT MULTIPLE-OUTPUT U-MIMO DATA TRANSMISSION METHOD AND BASE STATION

CROSS-REFERENCE TO RELATED APPLICATIONS

This application is a continuation of International Application No. PCT/CN2016/080680, filed on Apr. 29, 2016, the disclosure of which is hereby incorporated by reference in its entirety.

TECHNICAL FIELD

This application relates to the communications field, and in particular, to a multi-user multiple-input multiple-output (MU-MIMO) data transmission method and a base station.

BACKGROUND

In a multiple-input multiple-output (MIMO) technology, channel fading is suppressed by using a multiple-antenna technology in a base station and user equipment, so that a channel capacity, a network coverage area, and spectrum usage can be greatly improved. The MIMO technology includes a multi-user multiple-input multiple-output MU-MIMO technology and a single user multiple-input multiple-output (SU-MIMO) technology. For the MU-MIMO technology, the user equipment (UE) feeds back measured downlink channel information to the base station, and the base station selects, based on a scheduling policy, suitable UE for pairing. The base station performs, on a same communication resource, data transmission with UEs that are successfully paired.

In the prior art, for the MU-MIMO, due to interference between paired UEs and overheads of measurement pilots, system performance of the MU-MIMO is not significantly improved relative to the SU-MIMO.

SUMMARY

Embodiments of this application provide a multi-user multiple-input multiple-output MU-MIMO data transmission method and a base station, to implement MU-MIMO and effectively obtain a system gain of MU-MIMO.

According to a first aspect of the embodiments of this application, a multi-user multiple-input multiple-output MU-MIMO data transmission method is provided, and the method includes:

obtaining, by a base station, a first precoding matrix indicator PMI of first UE and a second PMI of second UE, where a first rank of the first UE is 1, and a second rank of the second UE is 1; scheduling, by the base station, the first UE, and selecting the second UE to perform pairing with the first UE, where a weighted value corresponding to the first PMI of the first UE after pairing and a weighted value corresponding to the second PMI of the second UE after pairing form a weighted value corresponding to a third PMI whose rank is 2; and determining, by the base station, whether a pairing gain of the first UE and the second UE is greater than a preset threshold, and if the pairing gain is greater than the preset threshold, separately performing, by the base station by using the third PMI and a same time-frequency resource, data transmission with the first UE and the second UE that are paired.

In a possible implementation, the pairing gain of the first UE and the second UE is calculated by performing the following operation: subtracting a scheduling priority of the first UE before pairing from a sum of a scheduling priority of the first UE after pairing and a scheduling priority of the second UE after pairing.

In another possible implementation, the scheduling priority of the first UE after pairing is obtained after spectral efficiency corresponding to a modulation and coding scheme MCS of the first UE after pairing is divided by a throughput of the first UE after pairing; the scheduling priority of the second UE after pairing is obtained after spectral efficiency corresponding to an MCS of the second UE after pairing is divided by a throughput of the second UE after pairing; and the scheduling priority of the first UE before pairing is obtained after spectral efficiency corresponding to an MCS of the first UE before pairing is divided by a throughput of the first UE before pairing.

In another possible implementation, the MCS of the first UE after pairing is obtained by performing the following operations:

converting a channel quality indicator CQI reported by the first UE into a signal-to-noise ratio corresponding to the first UE; reducing the signal-to-noise ratio of the first UE by 3 dB, and then converting the signal-to-noise ratio into a temporary MCS of the first UE; and adding the temporary MCS of the first UE and a first CQI adjustment amount, and using a sum as the MCS of the first UE after pairing; and the MCS of the second UE after pairing is obtained by performing the following operations:

converting a channel quality indicator CQI reported by the second UE into a signal-to-noise ratio corresponding to the second UE; reducing the signal-to-noise ratio of the second UE by 3 dB, and then converting the signal-to-noise ratio into a temporary MCS of the second UE; and adding the temporary MCS of the second UE and a second CQI adjustment amount, and using a sum as the MCS of the second UE after pairing.

Because both the rank of the first UE and the rank of the second UE are 1, data transmission is performed on a resource block whose rank is 2 after pairing. If a used MCS of the first UE before pairing is relatively large, a transmission error rate may increase. Based on the reason, the MCS of the first UE may be corrected according to the foregoing manner, so as to improve transmission accuracy of pairing.

In another possible implementation, a resource element RE of a physical downlink control channel PDCCH allocated by the base station to the second UE is located in a symbol occupied by a PDCCH of the base station before pairing.

To avoid a loss of a throughput that is caused because channel resources are reduced due to expansion of PDCCH symbols, the base station does not perform pairing on the first UE and UE to which PDCCH allocation fails for the first time. Therefore, PDCCH allocation to the second UE succeeds for the first time. In this case, reduction of the channel resources and a loss of the throughput are avoided.

According to a second aspect of the embodiments of this application, a base station is provided, and the base station has functions of implementing the method shown in the first aspect. The functions may be implemented by using hardware, or may be implemented by implementing corresponding software by hardware. The hardware or software includes one or more modules corresponding to the foregoing functions.

The base station provided in the second aspect of the embodiments of this application includes:

an obtaining unit, configured to obtain a first precoding matrix indicator PMI of first user equipment UE, where a first rank of the first UE is 1; where the obtaining unit is further configured to obtain a second PMI of second UE, where a second rank of the second UE is 1, and a weighted value corresponding to the first PMI and a weighted value corresponding to the second PMI form a weighted value corresponding to a third PMI whose rank is 2; and a processing unit, configured to separately perform, by using the third PMI and a same time-frequency resource, data transmission with the first UE and the second UE that are paired, where a pairing gain of the first UE and the second UE is greater than a preset threshold.

According to a third aspect of the embodiments of this application, a base station is provided, and the base station has functions of implementing the method shown in the first aspect. The functions may be implemented by using hardware, or may be implemented by implementing corresponding software by hardware. The hardware or software includes one or more modules corresponding to the foregoing functions.

The base station provided in the third aspect of the embodiments of this application includes:

a processor and a transceiver; where the transceiver is configured to obtain a first precoding matrix indicator PMI of first user equipment UE, where a first rank of the first UE is 1;

the transceiver is further configured to obtain a second PMI of second UE, where a second rank of the second UE is 1, and a weighted value corresponding to the first PMI and a weighted value corresponding to the second PMI form a weighted value corresponding to a third PMI whose rank is 2; and the processor is configured to separately perform, by using the third PMI and a same time-frequency resource, data transmission with the first UE and the second UE that are paired, where a pairing gain of the first UE and the second UE is greater than a preset threshold.

According to a fourth aspect of the embodiments of this application, a storage medium is provided, and is configured to store a computer software instruction used by the base station, and the computer software instruction includes a program designed for the base station to execute the foregoing aspects.

According to a fifth aspect of this application, a multi-user multiple-input multiple-output MU-MIMO data transmission method is provided, and the method includes:

obtaining, by a base station, a first precoding matrix indicator PMI of first user equipment UE, where a first rank of the first UE is 1;

obtaining, by the base station, a second PMI of second UE, where a second rank of the second UE is 1, and a weighted value corresponding to the first PMI and a weighted value corresponding to the second PMI form a weighted value corresponding to a third PMI whose rank is 2; and separately performing, by the base station by using the third PMI and a same time-frequency resource, data transmission with the first UE and the second UE that are paired, where a pairing gain of the first UE and the second UE is greater than a preset threshold.

According to a sixth aspect of this application, a multi-user multiple-input multiple-output MU-MIMO data transmission method is provided, and the method includes:

obtaining, by a base station, a first precoding matrix indicator PMI of first user equipment UE, where a first rank of the first UE is 2;

obtaining, by the base station, a second PMI of second UE, where a second rank of the second UE is 1, and a weighted value corresponding to the first PMI and a weighted value corresponding to the second PMI form a weighted value corresponding to a third PMI whose rank is 2; and separately performing, by the base station by using the third PMI and a same time-frequency resource, data transmission with the first UE and the second UE that are paired, where a pairing gain of the first UE and the second UE is greater than a preset threshold.

In the MU-MIMO data transmission method provided in the embodiments of this application, the base station obtains the first precoding matrix indicator PMI of the first UE and the second PMI of the second UE, where the first rank of the first UE is 1, and the second rank of the second UE is 1; the base station schedules the first UE, and selects the second UE to perform pairing with the first UE, where the weighted value corresponding to the first PMI of the first UE after pairing and the weighted value corresponding to the second PMI of the second UE after pairing form the weighted value corresponding to the third PMI whose rank is 2; and the base station determines whether the pairing gain of the first UE and the second UE is greater than the preset threshold, and if the pairing gain is greater than the preset threshold, the base station separately performs, by using the third PMI and the same time-frequency resource, data transmission with the first UE and the second UE that are paired. In this way, pairing between the first UE and the second UE is implemented, and a gain of the two UEs after they are paired is greater than a threshold, so that a system gain increases when the base station performs data transmission with the first UE and the second UE after they are paired, and quality of data transmission between the base station and the two UEs is improved.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
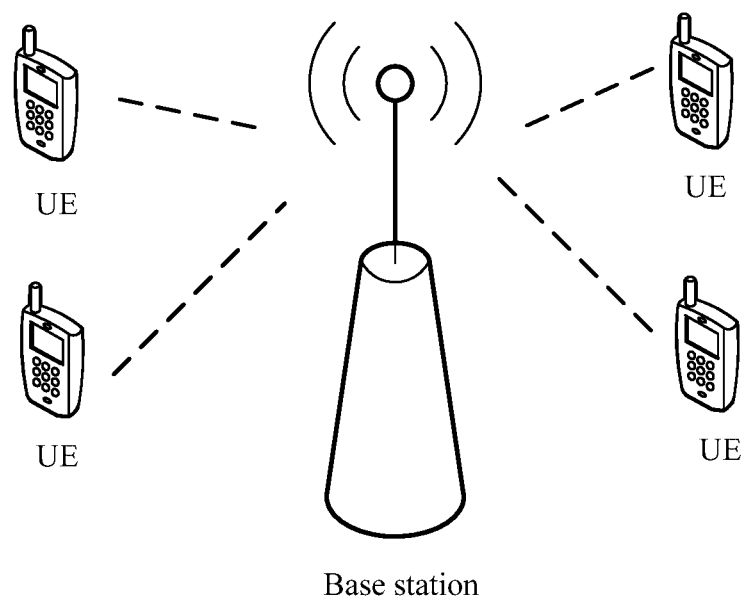
FIG. 1 is a schematic diagram of an embodiment of a network architecture applied to an embodiment of this application.

FIG. 1 is a schematic diagram of an architecture applied to an embodiment of this application. The architecture includes a base station and UEs, and there are two or more UEs. The UE feeds back a precoding matrix indicator (PMI), a channel quality indicator (CQI), and a rank indicator (RI) to the base station. The base station determines, based on the CQI fed back by the UE, a modulation and coding scheme (MCS) of the UE for the UE, and the base station further needs to allocate a physical downlink control channel (PDCCH) to the UE. This embodiment of this application is applicable to a network including 2/4/8 transmit antennas (2T/4T/8T), and also applicable to a network including more transmit antennas.

Figure 2:
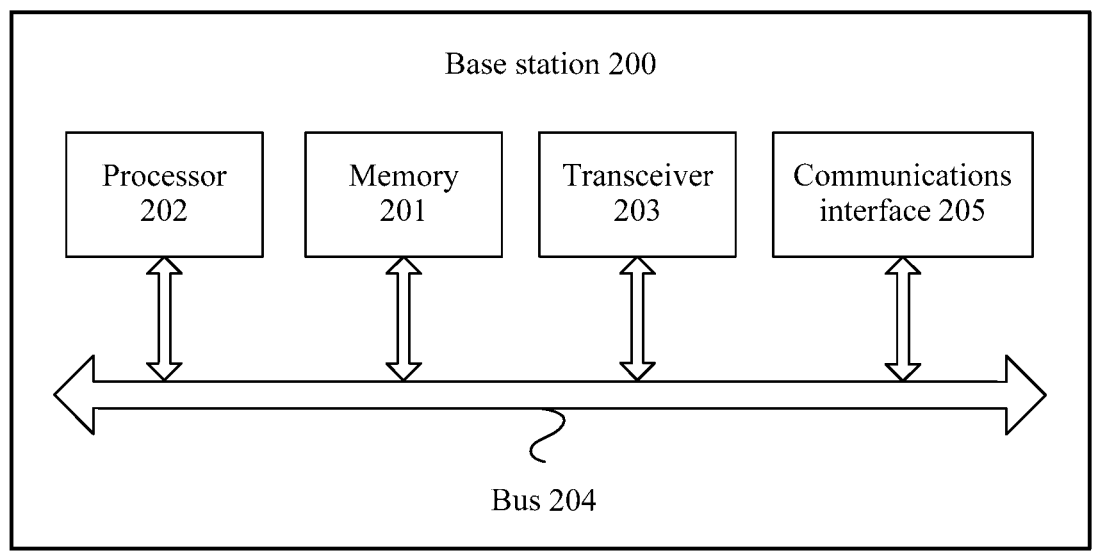
FIG. 2 is a schematic diagram of an embodiment of a base station according to an embodiment of this application.

The base station in FIG. 1 may be implemented by using a base station 200 in FIG. 2. The base station 200 includes a processor 202 and a transceiver 203, and the base station 200 may further include a memory 201 and a communications interface 205. The processor 202, the memory 201, the transceiver 203, and the communications interface 205 may implement a communication connection with each other by using a bus 204, or may implement communication by other means such as wireless transmission.

The memory 201 may include a volatile memory, for example, a random access memory (RAM); or the memory may include a non-volatile memory, such as a read-only memory (ROM), a flash memory, a hard disk drive (HDD), or a solid state drive (SSD); or the memory 201 may further include a combination of the foregoing types of memories. When the technical solution provided in this application is implemented by using software, a computer instruction used to implement steps that need to be performed in a MU-MIMO data transmission method provided in FIG. 3 of this application is stored in the memory 201, and is executed by the processor 202. Receiving and sending functions of the base station 200 are implemented by the processor 102 by invoking the computer instruction in the memory 201 to control the transceiver 203. The processor 202 may be a central processing unit (CPU).

The transceiver 203 is configured to obtain a first PMI of first UE, where a first rank of the first UE is 1.

The transceiver 203 is further configured to obtain a second PMI of second UE, where a second rank of the second UE is 1, and a weighted value corresponding to the first PMI and a weighted value corresponding to the second PMI form a weighted value corresponding to a third PMI whose rank is 2.

The processor 202 is configured to separately perform, by using the third PMI and a same time-frequency resource, data transmission with the first UE and the second UE that are paired, where a pairing gain of the first UE and the second UE is greater than a preset threshold.

Preferably, before the processor 202 separately performs, by using the third PMI and the same time-frequency resource, data transmission with the first UE and the second UE that are paired, the processor 202 is further configured to determine whether the pairing gain of the first UE and the second UE is greater than the preset threshold, and if the pairing gain is greater than the preset threshold, the processor 202 separately performs, by using the third PMI and the same time-frequency resource, data transmission with the first UE and the second UE that are paired.

The base station 200 provided in this embodiment of this application is also applicable to a case in which the rank of the first UE is 1, and the rank of the second UE is 2, or both the rank of the first UE and the rank of the second UE are 2.

When selecting second UE to perform pairing with the first UE, the base station 200 provided in this application first determines that a gain of the two UEs after they are paired is greater than a threshold, so as to ensure that a system gain can be generated after the two UEs are paired, and improve quality of data transmission between the base station and the two UEs.

Figure 3:
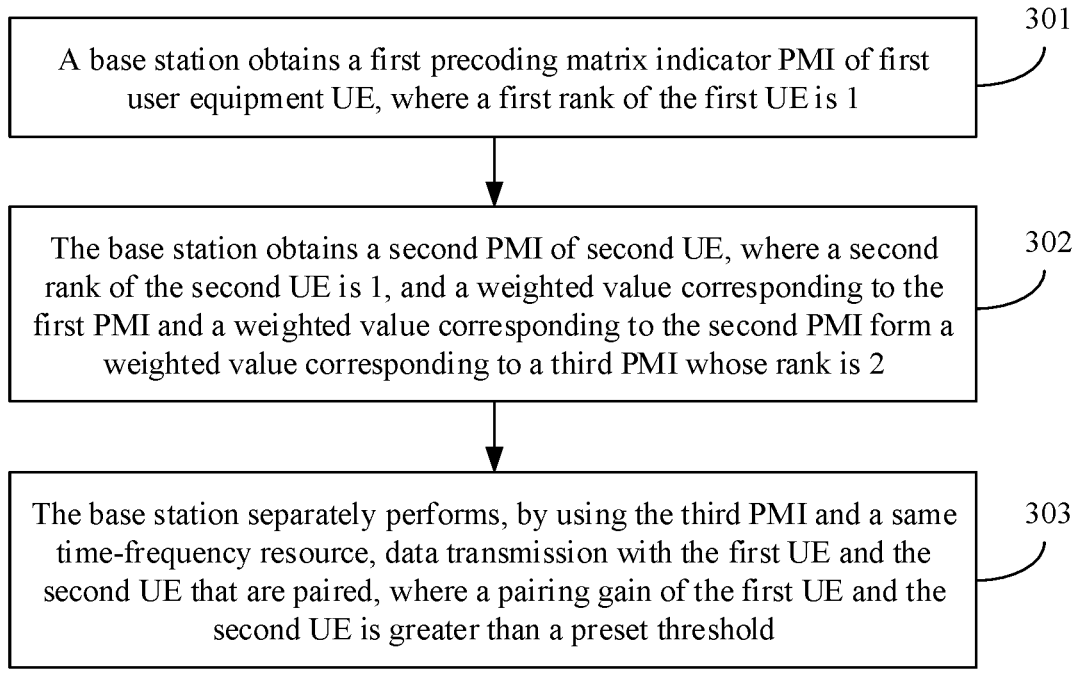
FIG. 3 is a schematic diagram of an embodiment of a MU-MIMO data transmission method according to an embodiment of this application.

This application further provides a MU-MIMO data transmission method. The base station in FIG. 1 and the base station 200 in FIG. 2 perform the method during operation. A schematic flowchart is shown in FIG. 3.

301. The base station obtains a first precoding matrix indicator PMI of first user equipment UE, where a first rank of the first UE is 1.

When the base station needs to deliver data to UE, the UE needs to feed back a PMI of the UE and a rank of the UE to the base station, where the PMI is an index, and is indicated by a digit in an index table, and each index in the index table is corresponding to a weighted value of the PMI. For example, the first rank of the first UE is 1, and the PMI of the first UE is 0, and a corresponding weighted value is [0.5, 0.5, 0.5, 0.5].

In a Long Term Evolution (LTE) network, when the base station needs to simultaneously deliver data to a plurality of UEs, the base station allocates a scheduling priority to each of the plurality of UEs, and the base station sequentially schedules, in descending order of the scheduling priorities of the UEs, the UEs to perform data transmission. In the MU-MIMO system in this embodiment of this application, the base station needs to perform pairing scheduling between any two UEs, to improve resource usage. Therefore, the base station needs to first schedule the first UE, and then select, from other UEs, second UE that can be paired with the first UE. Because pairing is performed based on a weighted value corresponding to a PMI of the UE, the base station needs to first obtain the first PMI of the first UE. In this embodiment of this application, the base station performs pairing on UEs whose ranks are 1, and therefore, the first rank of the first UE scheduled by the base station is 1.

Optionally, in actual application, this embodiment of this application is also applicable to a case in which the first rank of the first UE is 2. For example, the rank of the first UE is 2, and the first PMI is 8 in the index table, and a corresponding weighted value is $[0.5, 0.5, -0.5, -0.5; 0.5, 0.5, 0.5, 0.5]/\sqrt{2}$.

It should be noted that in this case, when scheduling the first UE, the base station does not start to deliver data to the first UE, and when scheduling the first UE, the base station completes necessary operations such as PDCCH allocation of the base station to the first UE and MCS calculation. The base station may determine, based on the scheduling priorities of the plurality of UEs to which data needs to be delivered, to schedule the first UE, and the first UE is UE with a highest scheduling priority in the plurality of UEs.

It should be noted that because the UE during transmission may fail to demodulate data sent by the base station, the base station performs scheduling of retransmission data on the first UE, namely, retransmission scheduling. Therefore, that the base station schedules the first UE may be that the base station performs initial transmission scheduling on the first UE, or may be that the base station performs retransmission scheduling on the first UE.

302. The base station obtains a second PMI of second UE, where a second rank of the second UE is 1, and a weighted value corresponding to the first PMI and a weighted value corresponding to the second PMI form a weighted value corresponding to a third PMI whose rank is 2.

After scheduling the first UE, to implement pairing between UEs, the base station needs to select second UE from the other UEs to perform pairing with the first UE. Optionally, the base station may select, from the other UEs, second UE with a highest scheduling priority to perform pairing with the first UE.

Specifically, the base station with 4T is used as an example for description.

A PMI whose rank is 1 includes 16 indexes that are respectively indicated by digits 0 to 15, and a PMI whose rank is 2 includes 16 indexes that are respectively indicated by digits 0 to 15, and specific weighted values corresponding to the PMIs are as follows:

A weighted value corresponding to each PMI whose rank is 1 is as follows:

PMI 0: [0.5, 0.5, 0.5, 0.5];
PMI 1: [0.5, 0.5i, −0.5, −0.5i];
PMI 2: [0.5, −0.5, 0.5, −0.5];
PMI 3: [0.5, −0.5i, −0.5. 0.5i];
PMI 4: [0.5, 0.3536+0.3536i, 0.5i, −0.3536+0.3536i];
PMI 5: [0.5, −0.3536+0.3536i, −0.5000i, 0.3536+0.3536i];
PMI 6: [0.5, −0.3536−0.3536i, 0.5i, 0.3536−0.3536i];
PMI 7: [0.5, 0.3536−0.3536i, −0.5i, −0.3536−0.3536i];
PMI 8: [0.5, 0.5, −0.5, −0.5];
PMI 9: [0.5, 0.5i, 0.5, 0.5i];
PMI 10: [0.5, −0.5, −0.5, 0.5];
PMI 11: [0.5, −0.5i, 0.5, −0.5i];
PMI 12: [0.5, 0.5, 0.5, −0.5];
PMI 13: [0.5, 0.5, −0.5, 0.5];
PMI 14: [0.5, −0.5, 0.5, 0.5]; and
PMI 15: [0.5, −0.5, −0.5, −0.5].

A weighted value corresponding to each PMI whose rank is 2 is as follows:

PMI 0: [0.5, 0.5, 0.5, 0.5; 0.5, −0.5, −0.5, 0.5]/$\sqrt{2}$;
PMI 1: [0.5, 0.5i, −0.5, −0.5i; −0.5i, 0.5, −0.5i, 0.5]/$\sqrt{2}$;
PMI 2: [0.5, −0.5, 0.5, −0.5; −0.5, 0.5, 0.5, −0.5]/$\sqrt{2}$;
PMI 3: [0.5, −0.5i, −0.5, 0.5i; 0.5i, 0.5, 0.5i, 0.5]/$\sqrt{2}$;
PMI 4: [0.5, 0.3536+0.3536i, 0.5i, −0.3536+0.3536i; −0.3536−0.3536i, 0.5i, −0.3536+0.3536i, 0.5]/$\sqrt{2}$;
PMI 5: [0.5, −0.3536+0.3536i, −0.5i, 0.3536+0.3536i; 0.3536−0.3536i, −0.5i, 0.3536+0.3536i, 0.5]/$\sqrt{2}$;
PMI 6: [0.5, −0.3536−0.3536i, 0.5i, 0.3536−0.3536i; −0.5i, 0.3536−0.3536i, 0.5, 0.3536+0.3536i]/$\sqrt{2}$;
PMI 7: [0.5, 0.3536−0.3536i, −0.5i, −0.3536−0.3536i; 0.5000i, −0.3536−0.3536i, 0.5, −0.3536+0.3536i]/$\sqrt{2}$;
PMI 8: [0.5, 0.5, −0.5, −0.5; 0.5, 0.5, 0.5, 0.5]/$\sqrt{2}$.
PMI 9: [0.5, 0.5i, 0.5, 0.5i; −0.5i, −0.5, −0.5i, 0.5]/$\sqrt{2}$.
PMI 10: [0.5, −0.5, −0.5, 0.5; −0.5, −0.5, 0.5, 0.5]/$\sqrt{2}$;
PMI 11: [0.5, −0.5i, 0.5, −0.5i; 0.5i, 0.5, 0.5i]/$\sqrt{2}$;
PMI 12: [0.5, 0.5, 0.5, −0.5; −0.5, 0.5, −0.5, 0.5]/$\sqrt{2}$;
PMI 13: [0.5, 0.5, −0.5, 0.5; −0.5, 0.5, 0.5, 0.5]/$\sqrt{2}$;
PMI 14: [0.5, −0.5, 0.5, 0.5; 0.5, 0.5, 0.5, −0.5]/$\sqrt{2}$; and
PMI 15: [0.5, −0.5, −0.5, −0.5; −0.5, 0.5, −0.5, −0.5]/$\sqrt{2}$.

A pairing rule for the first UE and the second UE is as follows: The weighted value corresponding to the first PMI and the weighted value corresponding to the second PMI form a weighted value corresponding to the third PMI whose rank is 2.

If the rank of the first UE is 1, and the rank of the second UE is 1, the third PMI whose rank is 2 and that is formed by pairing the first UE with the second UE needs to be one of third PMIs in Table 1, and the third PMI and used code word sequence numbers after pairing may be obtained by querying Table 1.

TABLE 1

| First PMI | Second PMI | Third PMI after pairing | Code word sequence number of the first UE after pairing | Code word sequence number of the second UE after pairing |
|---|---|---|---|---|
| 0 | 8 | 8 | 1 | 0 |
| 0 | 10 | 0 | 0 | 1 |
| 1 | 9 | 1 | 0 | 1 |
| 2 | 10 | 2 | 0 | 1 |
| 3 | 9 | 9 | 1 | 0 |
| 3 | 11 | 3 | 0 | 1 |
| 4 | 6 | 6 | 1 | 0 |
| 5 | 7 | 7 | 1 | 0 |
| 6 | 4 | 6 | 0 | 1 |
| 7 | 5 | 7 | 0 | 1 |
| 8 | 0 | 8 | 0 | 1 |
| 8 | 10 | 10 | 1 | 0 |
| 9 | 1 | 1 | 1 | 0 |
| 9 | 3 | 9 | 0 | 1 |
| 9 | 11 | 11 | 1 | 0 |
| 10 | 0 | 0 | 1 | 0 |
| 10 | 2 | 2 | 1 | 0 |
| 10 | 8 | 10 | 0 | 1 |
| 11 | 3 | 3 | 1 | 0 |
| 11 | 9 | 11 | 0 | 1 |
| 12 | 13 | 12 | 0 | 1 |
| 12 | 14 | 14 | 1 | 0 |
| 13 | 12 | 12 | 1 | 0 |
| 13 | 15 | 13 | 0 | 1 |
| 14 | 12 | 14 | 0 | 1 |
| 14 | 15 | 15 | 1 | 0 |
| 15 | 13 | 13 | 1 | 0 |
| 15 | 14 | 15 | 0 | 1 |

A combination rule in Table 1, namely, a pairing rule for the first UE and the second UE is as follows: The weighted value corresponding to the first PMI is a weighted value in one row of the weighted value corresponding to the third PMI, and the weighted value corresponding to the second PMI is a weighted value in the other row of the weighted value corresponding to the third PMI. For example:

The first PMI of the first UE is 0, and a corresponding weighted value is [0.5, 0.5, 0.5, 0.5].

The second PMI of the second UE is 8, and a corresponding weighted value is [0.5, 0.5, −0.5, −0.5].

A weighted value of a PMI indicated by 8 is [0.5, 0.5, −0.5, −0.5; 0.5, 0.5, 0.5, 0.5]/$\sqrt{2}$ in the weighted values corresponding to the third PMIs whose ranks are 2. The weighted value of the third PMI indicated by 8 is expressed in a form of a fractional expression. Specifically, the weighted value corresponding to the first PMI is a weighted value in one row (in this example, the second row) of a numerator of the weighted value corresponding to the third PMI indicated by 8, and the weighted value corresponding to the second PMI is a weighted value in the other row (in this example, the first row) of the numerator of the weighted value corresponding to the third PMI indicated by 8. The weighted value of the third PMI indicated by 8 meets the pairing rule for the first UE and the second UE, and the third PMI obtained after the first UE and the second UE are paired is 8.

The weighted value corresponding to the first PMI is consistent with content in the second row of the weighted value corresponding to the third PMI indicated by 8, and therefore, data of the first UE is placed on a first code word, that is, a code word sequence number of the first UE after pairing is 1. The weighted value corresponding to the PMI of the second UE is consistent with content in the first row of the weighted value corresponding to the third PMI indicated by 8, and therefore, data of the second UE is placed on a zeroth code word, that is, a code word sequence number of the second UE after pairing is 0.

Optionally, in actual application, the rank of the first UE may be 1, and the rank of the second UE may be 2. That is, this embodiment of this application is also applicable to a case in which the rank of the first UE is 1, and the rank of the second UE is 2. A pairing rule for the first UE and the second UE is as follows: The weighted value corresponding to the first PMI belongs to the weighted value corresponding to the second PMI, and because the rank of the second UE is 2, the second PMI is consistent with the third PMI.

If the rank of the first UE is 1, and the rank of the second UE is 2, the third PMI whose rank is 2 and that is formed by pairing the first UE with the second UE needs to be one of third PMIs in Table 1, and the third PMI and used code word sequence numbers after pairing may be obtained by querying Table 1.

TABLE 2

| First PMI | Second PMI | Third PMI after pairing | Code word sequence number of the first UE after pairing | Code word sequence number of the second UE after pairing |
| --- | --- | --- | --- | --- |
| 0 | 8 | 8 | 1 | 0 |
| 0 | 0 | 0 | 0 | 1 |
| 1 | 1 | 1 | 0 | 1 |
| 2 | 2 | 2 | 0 | 1 |
| 3 | 9 | 9 | 1 | 0 |
| 3 | 3 | 3 | 0 | 1 |
| 4 | 4 | 4 | 0 | 1 |
| 4 | 6 | 6 | 1 | 0 |
| 5 | 5 | 5 | 0 | 1 |
| 5 | 7 | 7 | 1 | 0 |
| 6 | 6 | 6 | 1 | 0 |
| 7 | 7 | 7 | 0 | 1 |
| 8 | 8 | 8 | 0 | 1 |
| 8 | 10 | 10 | 1 | 0 |
| 9 | 1 | 1 | 1 | 0 |
| 9 | 9 | 9 | 0 | 1 |
| 9 | 11 | 11 | 1 | 0 |
| 10 | 0 | 0 | 1 | 0 |
| 10 | 2 | 2 | 1 | 0 |
| 10 | 10 | 10 | 0 | 1 |
| 11 | 3 | 3 | 1 | 0 |
| 11 | 11 | 11 | 0 | 1 |
| 12 | 12 | 12 | 0 | 1 |
| 12 | 14 | 14 | 1 | 0 |
| 13 | 12 | 12 | 1 | 0 |
| 13 | 13 | 13 | 0 | 1 |
| 14 | 14 | 14 | 0 | 1 |
| 14 | 15 | 15 | 1 | 0 |
| 15 | 13 | 13 | 1 | 0 |
| 15 | 15 | 15 | 0 | 1 |

A combination rule in Table 2, namely, a pairing rule for the first UE and the second UE is as follows: The weighted value corresponding to the PMI of the first UE is a weighted value in one row of the weighted value corresponding to the PMI of the second UE. For example:

The first PMI of the first UE is 0, and a corresponding weighted value is [0.5, 0.5, 0.5, 0.5].

The second PMI of the second UE is 8, and a corresponding weighted value is [0.5, 0.5, −0.5, −0.5; 0.5, 0.5, 0.5, 0.5]/$\sqrt{2}$.

The weighted value corresponding to the second PMI is expressed in a form of a fractional expression. Specifically, that the weighted value corresponding to the first PMI is a weighted value in one row of the weighted value corresponding to the second PMI is specifically as follows: The weighted value corresponding to the first PMI is a weighted value in one row (in this example, the second row) of a numerator of the weighted value corresponding to the second PMI. The weighted value of the second PMI indicated by 8 meets the pairing rule for the first UE and the second UE, and the third PMI obtained after the first UE and the second UE are paired is 8. In this case, the second PMI is consistent with the third PMI.

The weighted value corresponding to the first PMI is consistent with content in the second row of the weighted value corresponding to the second PMI, and therefore, data of the first UE is placed on a first code word, that is, a code word sequence number of the first UE after pairing is 1, and a code word sequence number of the second UE after pairing is 0.

If the rank of the first UE is 2, and the rank of the second UE is 2, a pairing rule for the first UE and the second UE and a pairing result are similar to those in the foregoing description, and details are not described herein again.

Optionally, in actual application, the rank of the first UE may be 2, and the rank of the second UE may also be 2. That is, this embodiment of this application is also applicable to a case in which both the rank of the first UE and the rank of the second UE are 2. A pairing rule for the first UE and the second UE is as follows: The weighted value corresponding to the first PMI is equal to the weighted value corresponding to the second PMI.

For example, with reference to Table 1 and Table 2, the first PMI is 8, and a corresponding weighted value is [0.5, 0.5, −0.5, −0.5; 0.5, 0.5, 0.5, 0.5]/$\sqrt{2}$.

The second PMI is 8, and a corresponding weighted value is [0.5, 0.5, −0.5, −0.5; 0.5, 0.5, 0.5, 0.5]/$\sqrt{2}$. A weighted value of a PMI indicated by 8 meets a pairing rule for a weighted value of a PMI of the first UE and a weighted value of a PMI of the second UE, and the third PMI obtained after the first UE and the second UE are paired is 8. In this case, the first PMI, the second PMI, and the third PMI are consistent.

Before code word sequence numbers of the first UE and the second UE after pairing are determined, a pairing gain of the first UE whose code word sequence number is 1 and the second UE whose code word sequence number is 0 is first calculated, and then a pairing gain of the first UE whose code word sequence number is 0 and the second UE whose code word sequence number is 1 is calculated. Sequences of calculating the two pairing gains may be interchanged, and a calculation manner with a larger pairing gain is selected based on calculation results of the two pairing gains, so as to determine that the code word sequence number of the first UE is 1 or 0, and the code word sequence number of the second UE after pairing is 0 or 1.

303. The base station separately performs, by using the third PMI and a same time-frequency resource, data transmission with the first UE and the second UE that are paired, where a pairing gain of the first UE and the second UE is greater than a preset threshold.

After the base station performs pairing on the first UE and the second UE, the base station can separately perform, by using the third PMI and the same time-frequency resource, data transmission with the first UE and the second UE that are paired.

Optionally, the pairing gain of the first UE and the second UE is calculated by performing the following operation: subtracting a scheduling priority of the first UE before pairing from a sum of a scheduling priority of the first UE after pairing and a scheduling priority of the second UE after pairing. The scheduling priority is a proportional fair (PF) scheduling priority.

The PF scheduling priority is a value obtained by dividing spectral efficiency by a throughput. Spectral efficiency corresponding to an MCS of the first UE after pairing is divided by a throughput of the first UE after pairing, to obtain a PF scheduling priority of the first UE after pairing. The MCS of the first UE after pairing is an MCS of a code word sequence number corresponding to the first UE after pairing, and the throughput of the first UE after pairing is a data volume transmitted by the first UE within a period after pairing. Spectral efficiency corresponding to an MCS of the second UE after pairing is divided by a throughput of the second UE after pairing, to obtain a PF scheduling priority of the second UE after pairing. The MCS of the second UE after pairing is an MCS of a code word sequence number corresponding to the second UE after pairing, and the throughput of the second UE after pairing is a data volume transmitted by the second UE within a period after pairing. Spectral efficiency corresponding to an MCS of the first UE before pairing is divided by a throughput of the first UE before pairing, to obtain a PF scheduling priority of the first UE before pairing, and the throughput of the first UE before pairing is a data volume transmitted by the first UE within a period before pairing.

Optionally, if both the rank of the first UE and the rank of the second UE are 2, calculating the PF scheduling priority of the first UE after pairing includes: adding spectral efficiency corresponding to an MCS of a first code word of the first UE after pairing and spectral efficiency corresponding to an MSC of a second code word, and then dividing a sum by the throughput of the first UE after pairing. A process of calculating the PF scheduling priority of the second UE after pairing is the same as the foregoing calculation process.

Optionally, when the rank of the first UE is 1, that the base station calculates an MCS of the first UE during pairing specifically includes the following operations.

The base station receives a channel quality indicator CQI fed back by the first UE.

The base station calculates an initial block error rate IBLER of the first UE based on an acknowledgement (ACK) message and a negative acknowledgement (NACK) message that are fed back by the first UE during pairing.

After the first UE is paired, in a data exchange process with the base station, the first UE sends several ACK and/or NACK messages to the base station in response to the base station. Therefore, the base station may count, within a preset period, the ACK and NACK messages that are fed back by the first UE, to calculate a corresponding IBLER measurement value, and a specific formula is as follows:

$$IblerMeas = \frac{NumOfNack_I}{NumOfNack_I + NumOfAck_I};$$

where
IblerMeas indicates an initial block error rate IBLER; $NumOfNack_I$ indicates a quantity of NACK messages; and $NumOfAck_I$ indicates a quantity of ACK messages.

The base station obtains, through calculation, a CQI adjustment amount of the first UE based on a preset target IBLER and the IBLER of the first UE.

A specific formula for calculating the CQI adjustment amount is as follows:

$$CurCqiAdj = \frac{IblerTarget - IblerMeas}{1 - IblerTarget},$$

and

CQIAdj(*t*)=CQIAdj(*t*−1)+CqiAdjStep*CurCqiAdj;
where

CurCqiAdj indicates an instantaneous CQI adjustment amount; IblerTarget indicates the preset target IBLER; IblerMeas indicates the initial block error rate obtained through calculation; CQIAdj(t) indicates a current CQI adjustment amount, that is, an adjustment amount obtained after historical accumulation; CQIAdj(t−1) indicates a previous adjustment amount; CqiAdjStep indicates an adjusted step; and CqiAdj Step is a configurable parameter, and a default value is 0.1. Each code word of each UE maintains one CQIAdj(t).

The base station converts a channel quality indicator CQI reported by the first UE into a signal-to-noise ratio corresponding to the first UE; reduces the signal-to-noise ratio of the first UE by 3 dB, and then converts the signal-to-noise ratio into a temporary MCS of the first UE; and adds the temporary MCS of the first UE and a first CQI adjustment amount, and uses a sum as the MCS of the first UE after pairing.

Because the rank of the first UE is 1, data transmission is performed on a resource block whose rank is 2 after pairing. If a used MCS of the first UE before pairing is relatively large, a transmission error rate may increase. Based on the reason, the MCS of the first UE may be corrected according to the foregoing manner, so as to improve transmission accuracy of pairing. Reduction by 3 dB is one implementation, and in actual application, how many decibels are to be reduced may be specifically set based on an actual application situation.

Optionally, if the rank of the first UE is 2, the MCS of the first UE does not need to be corrected, and an MCS of the first UE after pairing is consistent with an MCS of the first UE before pairing. Specifically, an MCS converted from a CQI fed back by the first UE and a CQI adjustment amount are added, to obtain the MCS of the first UE.

A manner of calculating an MCS of the second UE during pairing and a manner of calculating an MCS of the second UE before pairing are similar to those in the foregoing description, and details are not described herein again.

In this application, the second UE is UE that is selected from a UE set including a plurality of to-be-selected UEs to perform pairing with the first UE. In actual application, there are many manners of selecting the second UE from the UE set. A pairing gain is always generated after pairing is performed on each UE and the first UE, and when the pairing gain is relatively large, it facilitates data transmission. Therefore, when the second UE is selected from the UE set, the base station needs to determine whether a pairing gain of the second UE and the first UE after they are paired is greater than a preset threshold, namely, whether the pairing gain is relatively large to facilitate data transmission. Therefore, in this application, the base station further needs to calculate a pairing gain of each UE in the UE set and the first UE after pairing, so as to select preferred second UE to perform pairing with the first UE.

In another implementation, the base station may calculate a pairing gain of each UE in the UE set and the first UE, and select second UE with a largest pairing gain from the UE set to perform pairing with the first UE.

Before the base station obtains a precoding matrix indicator PMI of the second UE and a PMI of the first UE, the base station has obtained, through calculation, an MCS of the first UE before pairing.

The base station first schedules the first UE, and the first UE feeds back the PMI and the CQI of the first UE. In this case, the base station may determine the MCS of the first UE before pairing. A calculation manner of determining the MCS of the first UE before pairing is similar to a manner of determining the MCS of the first UE during pairing, and a difference lies in that the ACK and NACK messages fed back by the first UE are fed back when the first UE performs data exchange before pairing. Because there is no interference to the first UE before pairing, even if the first UE includes one code word, after the CQI of the first UE is converted into a corresponding MCS, the corresponding MCS does not need to be corrected.

Optionally, when the first UE fails to perform pairing with the second UE, the base station schedules the first UE to perform data transmission, and the first UE uses the MCS before pairing.

In a process of selecting second UE to perform pairing with the first UE, there may be no second UE that can perform pairing with the first UE. Therefore, the base station separately schedules the first UE to perform data transmission, and in this case, the first UE uses the MCS before pairing.

Optionally, a resource element RE of a physical downlink control channel PDCCH allocated by the base station to the second UE is located in a symbol occupied by a PDCCH of the base station before pairing.

According to an existing PDCCH channel allocation manner, if the base station fails to allocate a PDCCH to UE for the first time, the base station increases a quantity of PDCCH symbols by 1, and the base station can successfully allocate a PDCCH to the UE next time. For example, a quantity of current PDCCH symbols is 1. If a quantity of resource elements (RE) of the PDCCH of the UE after pairing is not enough, in other words, a quantity of subcarriers is not enough, PDCCH allocation to the UE fails. Normally, the quantity of PDCCH symbols is increased to 2 at a next moment. Because the quantity of PDCCH symbols increases, available resources on a data channel are correspondingly reduced. A quantity of control channel symbols is increased by 1, data channel resources are decreased by about 1/12, and a throughput correspondingly loses 1/12. This greatly affects a gain after pairing. If a result of pre-allocation to the UE is not stored on a final PDCCH, the quantity of PDCCH symbols does not increase at a next moment. Therefore, in this embodiment of this application, UE that undergoes a PDCCH pre-allocation failure may be removed, and no pairing is performed.

The base station pre-allocates the PDCCH based on an MCS of the UE before pairing. When all UEs are traversed, PDCCH allocation to current UE does not affect PDCCH allocation to next UE, that is, pre-allocation to each UE is not stored in a final PDCCH allocation result. If PDCCH pre-allocation to current UE fails, expansion of PDCCH symbols is not caused, pairing is not performed on the UE, and next UE is continuously selected. Therefore, in this embodiment of this application, the RE of the PDCCH allocated by the base station to the second UE is located in the symbol occupied by the PDCCH of the base station before pairing.

In this embodiment of this application, pairing between the first UE and the second UE is implemented, the pairing gain of the first UE and the second UE is greater than the preset threshold, and the base station separately performs, by using the same time-frequency resource, data transmission with the first UE and the second UE that are paired. In this way, when selecting the second UE to perform pairing with the first UE, the base station first determines that a gain of the two UEs after they are paired is greater than a threshold, so as to ensure that a system gain can be generated after the two UEs are paired, and improve quality of data transmission between the base station and the two UEs. In this embodiment of this application, to avoid a loss of a throughput that is caused because channel resources are reduced due to expansion of the PDCCH symbols, the base station does not perform pairing on the first UE and UE to which PDCCH allocation fails for the first time, so as to avoid reduction of the channel resources and a loss of the throughput. This embodiment of this application is also applicable to a case in which the rank of the first UE is 1, and the rank of the second UE is 2, or both the rank of the first UE and the rank of the second UE are 2. Therefore, regardless of whether the rank of the first UE is 1 or 2, and the rank of the second UE is 1 or 2, the base station can perform pairing on the first UE and the second UE, so as to improve resource usage.

This application further provides a base station 400, and the device may be implemented by using the base station shown in FIG. 1 or the base station 200 shown in FIG. 2, or may be implemented by using an application-specific integrated circuit (ASIC), or implemented by using a programmable logic device (PLD). The PLD may be a complex programmable logic device (CPLD), a field programmable gate array (FPGA), generic array logic (GAL), or any combination thereof. The base station 400 is configured to implement the method performed by the base station shown in FIG. 3. When the method performed by the base station shown in FIG. 3 is implemented by using software, the base station 400 may be alternatively a software module.

Figure 4:
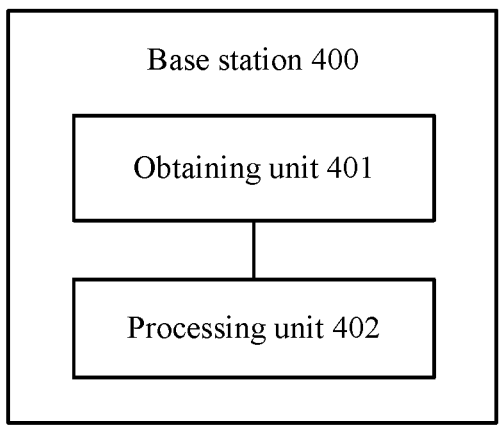
FIG. 4 is a schematic diagram of another embodiment of a base station according to an embodiment of this application.

A schematic diagram of an organizational structure of the base station 400 is shown in FIG. 4, and includes an obtaining unit 401 and a processing unit 402.

The obtaining unit 401 is configured to obtain a first precoding matrix indicator PMI of first user equipment UE, where a first rank of the first UE is 1.

The obtaining unit 401 is further configured to obtain a second PMI of second UE, where a second rank of the second UE is 1, and a weighted value corresponding to the first PMI and a weighted value corresponding to the second PMI form a weighted value corresponding to a third PMI whose rank is 2.

The processing unit 402 is configured to separately perform, by using the third PMI and a same time-frequency resource, data transmission with the first UE and the second UE that are paired, where a pairing gain of the first UE and the second UE is greater than a preset threshold.

Optionally, the processing unit 402 is further configured to: before separately performing, by using the third PMI and the same time-frequency resource, data transmission with the first UE and the second UE that are paired, determine whether the pairing gain of the first UE and the second UE is greater than the preset threshold.

Optionally, the processing unit 402 is further configured to calculate the pairing gain of the first UE and the second UE, and a specific calculation manner includes:

subtracting a scheduling priority of the first UE before pairing from a sum of a scheduling priority of the first UE after pairing and a scheduling priority of the second UE after pairing.

Optionally, the processing unit 402 is further configured to calculate the scheduling priority of the first UE after pairing, and a specific calculation manner includes: dividing spectral efficiency corresponding to a modulation and coding scheme MCS of the first UE after pairing by a throughput of the first UE after pairing.

The processing unit 402 is further configured to calculate the scheduling priority of the second UE after pairing, and a specific calculation manner includes: dividing spectral efficiency corresponding to an MCS of the second UE after pairing by a throughput of the second UE after pairing.

The processing unit 402 is further configured to calculate the scheduling priority of the first UE before pairing, and a specific calculation manner includes: dividing spectral efficiency corresponding to an MCS of the first UE before pairing by a throughput of the first UE before pairing.

Optionally, the processing unit 402 is further configured to calculate the MCS of the first UE after pairing, and a specific calculation manner includes:

converting a channel quality indicator CQI reported by the first UE into a signal-to-noise ratio corresponding to the first UE; reducing the signal-to-noise ratio of the first UE by 3 dB, and then converting the signal-to-noise ratio into a temporary MCS of the first UE; and adding the temporary MCS of the first UE and a first CQI adjustment amount, and using a sum as the MCS of the first UE after pairing.

The processing unit 402 is further configured to calculate the MCS of the second UE after pairing, and a specific calculation manner includes:

converting a channel quality indicator CQI reported by the second UE into a signal-to-noise ratio corresponding to the second UE; reducing the signal-to-noise ratio of the second UE by 3 dB, and then converting the signal-to-noise ratio into a temporary MCS of the second UE; and adding the temporary MCS of the second UE and a second CQI adjustment amount, and using a sum as the MCS of the second UE after pairing.

Optionally, the processing unit 402 is further configured to allocate a PDCCH to the second UE, and a resource element RE of the PDCCH is located in a symbol occupied by a PDCCH of the base station before pairing.

The base station 400 provided in this embodiment of this application is also applicable to a case in which the rank of the first UE is 1, and the rank of the second UE is 2, or both the rank of the first UE and the rank of the second UE are 2.

When selecting second UE to perform pairing with the first UE, the base station 400 provided in this application first determines that a gain of the two UEs after they are paired is greater than a threshold, so as to ensure that a system gain can be generated after the two UEs are paired, and improve quality of data transmission between the base station and the two UEs.

An embodiment of this application further provides a computer storage medium. The computer storage medium may store a program, and when the program is executed, some or all of the steps of the MU-MIMO data transmission method described in the foregoing method embodiments may be performed.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A multi-user multiple-input multiple-output (MU-MIMO) data transmission method, wherein the method comprises:

obtaining, by a base station, a first precoding matrix indicator (PMI) of first user equipment (UE), wherein a first rank of the first UE is 1;

obtaining, by the base station, a second PMI of a second UE, wherein a second rank of the second UE is 1, and a weighted value corresponding to the first PMI and a weighted value corresponding to the second PMI form a weighted value corresponding to a third PMI whose rank is 2;

pairing the first UE and the second UE based on the first rank of the first UE and the second rank of the second UE being both 1;

determining a pairing gain of the first UE and the second UE is greater than a preset threshold; and based on the determination that a pairing gain of the first UE and the second UE is greater than the preset threshold, separately performing, by the base station by using the third PMI and a same time-frequency resource, data transmission with the first UE and the second UE that are paired, wherein a pairing gain of the first UE and the second UE is greater than a preset threshold.

2. The method according to claim 1, wherein the pairing gain of the first UE and the second UE is calculated by performing the following operation:

subtracting a scheduling priority of the first UE before pairing from a sum of a scheduling priority of the first UE after pairing and a scheduling priority of the second UE after pairing.

3. The method according to claim 2, wherein, the scheduling priority of the first UE after pairing is obtained after spectral efficiency corresponding to a modulation and coding scheme (MCS) of the first UE after pairing is divided by a throughput of the first UE after pairing; the scheduling priority of the second UE after pairing is obtained after spectral efficiency corresponding to an MCS of the second UE after pairing is divided by a throughput of the second UE after pairing; and the scheduling priority of the first UE before pairing is obtained after spectral efficiency corresponding to an MCS of the first UE before pairing is divided by a throughput of the first UE before pairing.

4. The method according to claim 3, wherein the MCS of the first UE after pairing is obtained by performing the following operations:

converting a channel quality indicator (CQI) reported by the first UE into a signal-to-noise ratio corresponding to the first UE;

reducing the signal-to-noise ratio of the first UE by 3 dB, and then converting the signal-to-noise ratio into a temporary MCS of the first UE; and adding the temporary MCS of the first UE and a first CQI adjustment amount, and using a sum as the MCS of the first UE after pairing; and, wherein the MCS of the second UE after pairing is obtained by performing the following operations:

converting a channel quality indicator CQI reported by the second UE into a signal-to-noise ratio corresponding to the second UE;

reducing the signal-to-noise ratio of the second UE by 3 dB, and then converting the signal-to-noise ratio into a temporary MCS of the second UE; and adding the temporary MCS of the second UE and a second CQI adjustment amount, and using a sum as the MCS of the second UE after pairing.

5. The method according to claim 1, wherein before pairing the first UE and the second UE, a resource element (RE) of a physical downlink control channel (PDCCH) allocated by the base station to the second UE is located in a symbol occupied by the PDCCH.

6. A base station, wherein the base station comprises a processor and a transceiver;

the transceiver is configured to:

obtain a first precoding matrix indicator (PMI) of first user equipment (UE), wherein a first rank of the first UE is 1; and obtain a second PMI of a second UE, wherein a second rank of the second UE is 1, and a weighted value corresponding to the first PMI and a weighted value corresponding to the second PMI form a weighted value corresponding to a third PMI whose rank is 2; and the processor is configured to:

pair the first UE and the second UE based on the first rank of the first UE and the second rank of the second UE being both 1;

determine a pairing gain of the first UE and the second UE is greater than a preset threshold; and based on the determination that a pairing gain of the first UE and the second UE is greater than the preset threshold, separately perform, by using the third PMI and a same time-frequency resource, data transmission with the first UE and the second UE that are paired, wherein a pairing gain of the first UE and the second UE is greater than a preset threshold.

7. The base station according to claim 6, wherein the processor is further configured to:

subtract a scheduling priority of the first UE before pairing from a sum of a scheduling priority of the first UE after pairing and a scheduling priority of the second UE after pairing.

8. The base station according to claim 7, wherein the scheduling priority of the first UE after pairing is obtained after spectral efficiency corresponding to a modulation and coding scheme (MCS) of the first UE after pairing is divided by a throughput of the first UE after pairing;

the scheduling priority of the second UE after pairing is obtained after spectral efficiency corresponding to an MCS of the second UE after pairing is divided by a throughput of the second UE after pairing; and the scheduling priority of the first UE before pairing is obtained after spectral efficiency corresponding to an MCS of the first UE before pairing is divided by a throughput of the first UE before pairing.

9. The base station according to claim 8, the processor is further configured to:

convert a channel quality indicator (CQI) reported by the first UE into a signal-to-noise ratio corresponding to the first UE; reducing the signal-to-noise ratio of the first UE by 3 dB, and then converting the signal-to-noise ratio into a temporary MCS of the first UE; and adding the temporary MCS of the first UE and a first CQI adjustment amount, and using a sum as the MCS of the first UE after pairing; and convert a channel quality indicator CQI reported by the second UE into a signal-to-noise ratio corresponding to the second UE; reducing the signal-to-noise ratio of the second UE by 3 dB, and then converting the signal-to-noise ratio into a temporary MCS of the second UE; and adding the temporary MCS of the second UE and a second CQI adjustment amount, and using a sum as the MCS of the second UE after pairing.

10. The base station according to claim 6, wherein before pairing the first UE and the second UE,
a resource element (RE) of a physical downlink control channel (PDCCH) allocated by the base station to the second UE is located in a symbol occupied by the PDCCH.

\* \* \* \* \*